June 19, 1956  F. L. NICKERSON  2,751,061
LITTER REMOVING APPARATUS
Filed June 29, 1954  5 Sheets-Sheet 3
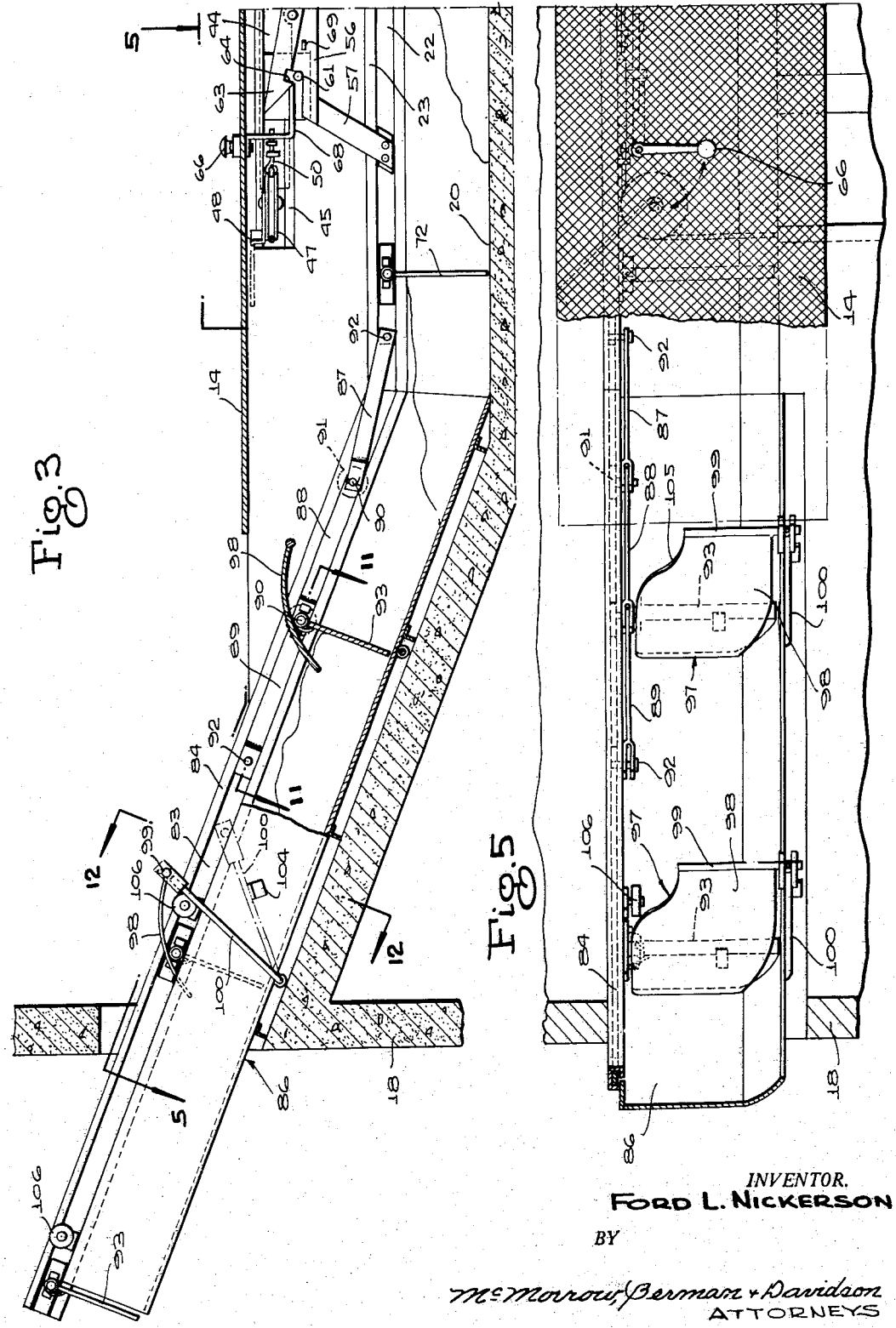
INVENTOR.
FORD L. NICKERSON
BY
McMorrow, Berman + Davidson
ATTORNEYS June 19, 1956 F. L. NICKERSON 2,751,061
LITTER REMOVING APPARATUS
Filed June 29, 1954 5 Sheets—Sheet 4
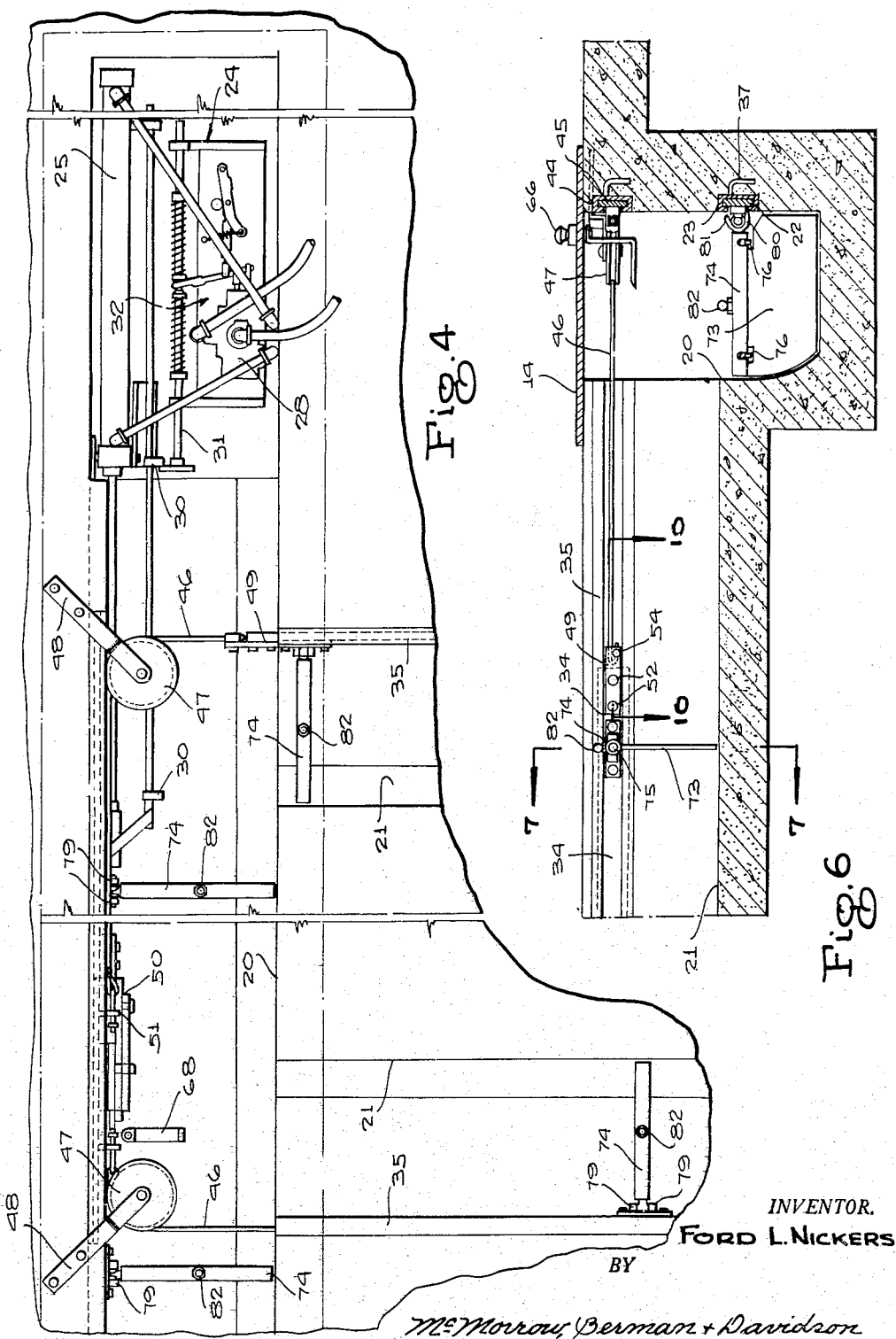
INVENTOR.
FORD L. NICKERSON
BY
McMorrow, Berman + Davidson
ATTORNEYS June 19, 1956  F. L. NICKERSON  2,751,061
LITTER REMOVING APPARATUS
Filed June 29, 1954  5 Sheets-Sheet 5
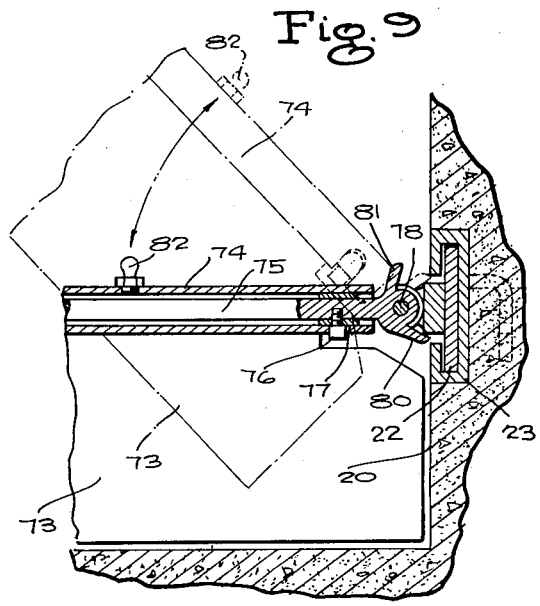
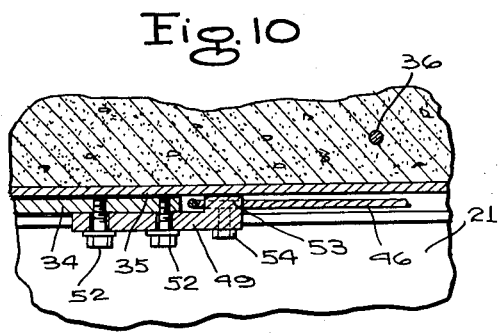
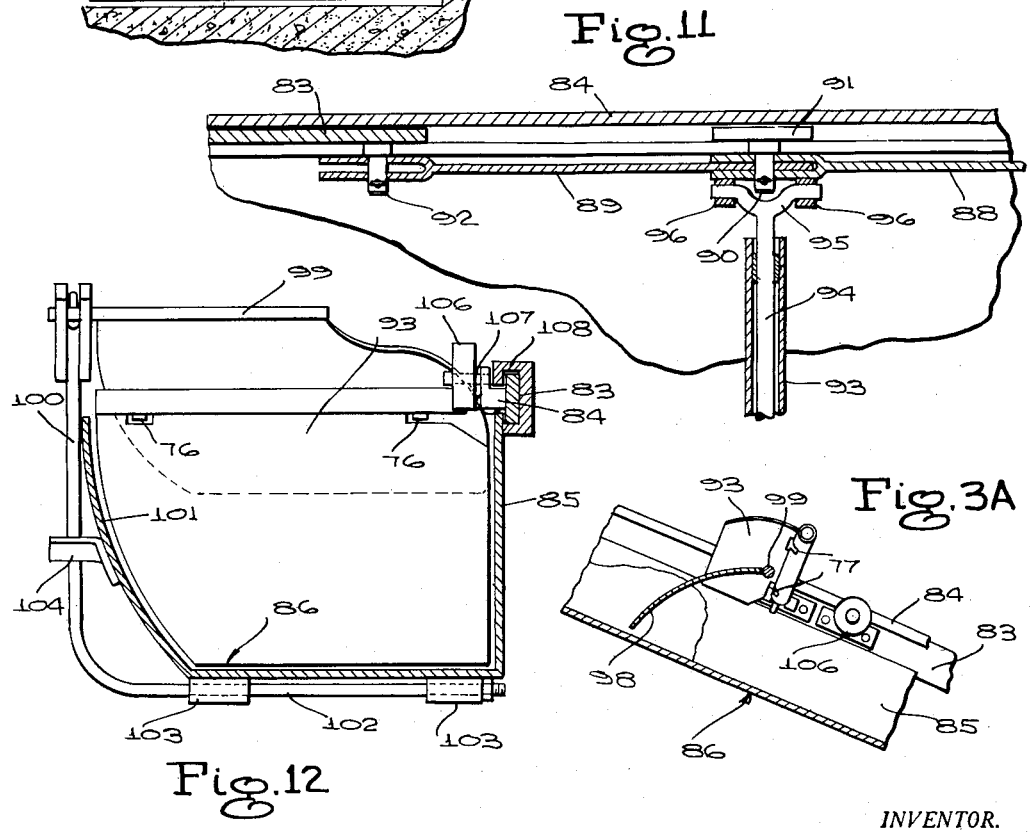
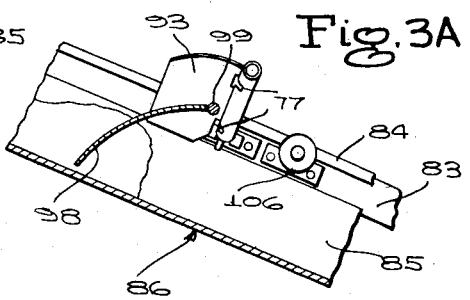
INVENTOR.
FORD L. NICKERSON
BY
McMorrow, Berman & Davidson
ATTORNEYS

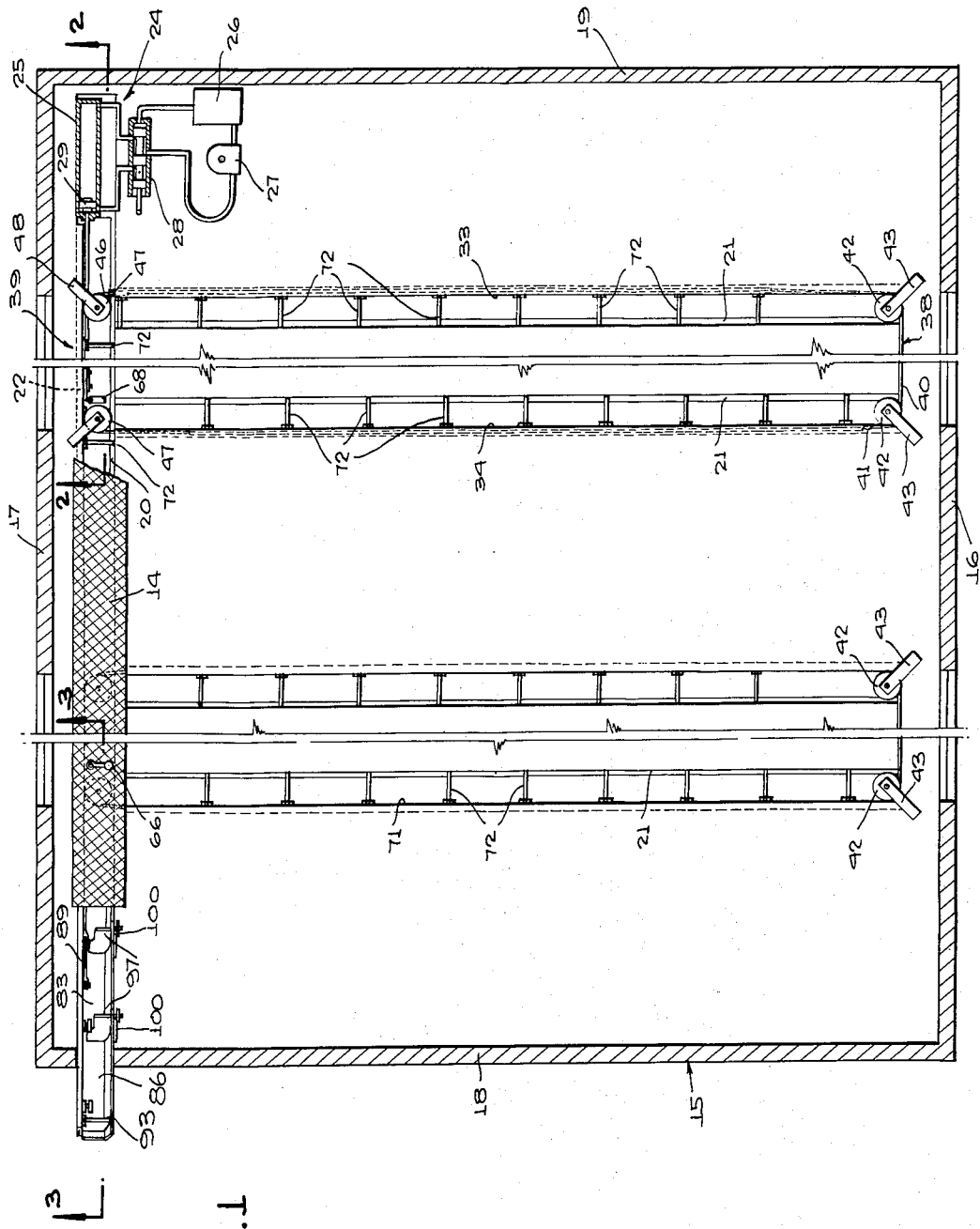

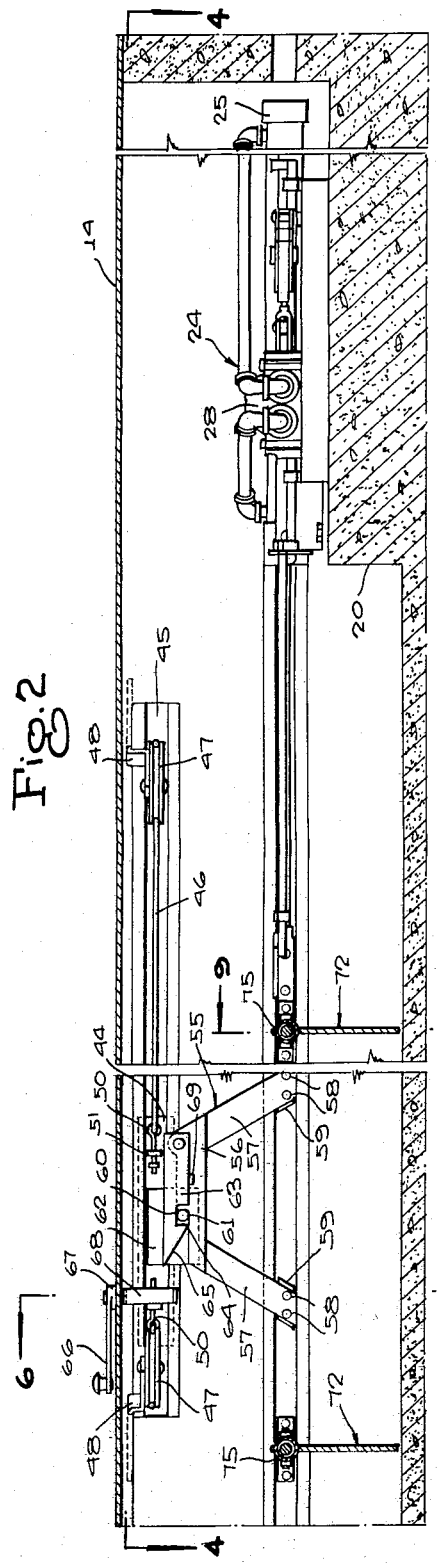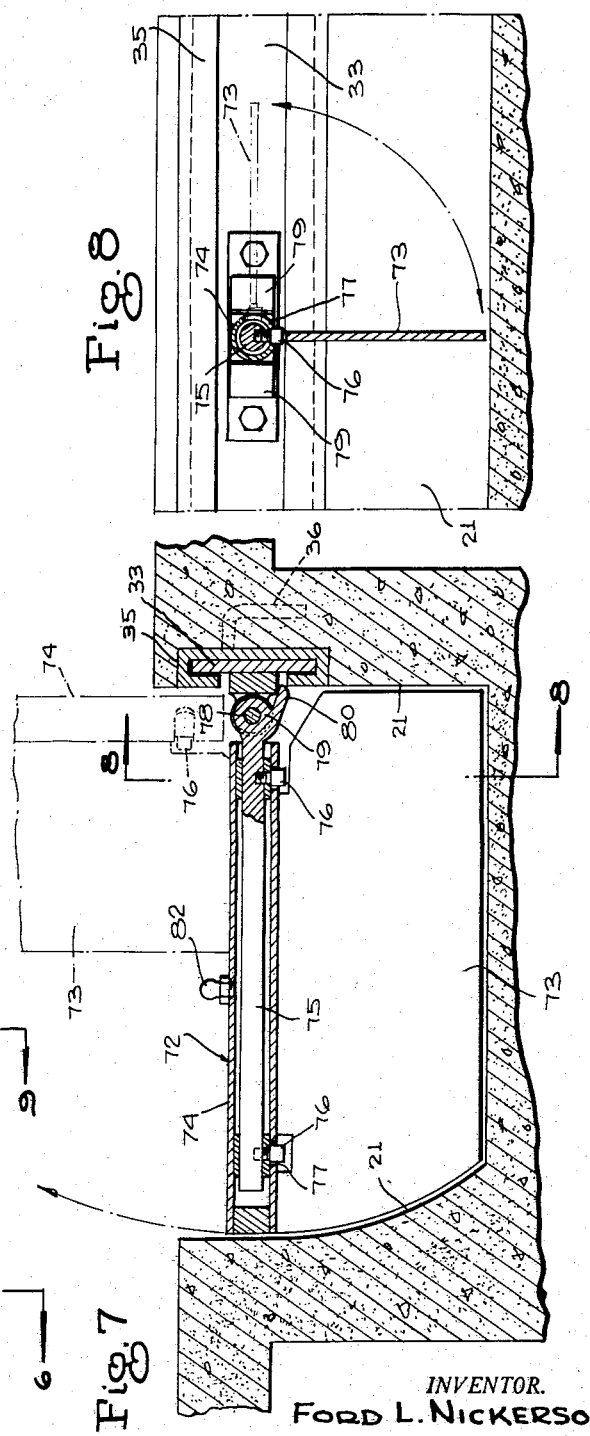

United States Patent Office 2,751,061
Patented June 19, 1956

2,751,061

LITTER REMOVING APPARATUS

Ford L. Nickerson, Gilboa, N. Y.

Application June 29, 1954, Serial No. 440,142

5 Claims. (Cl. 198—79)

This invention relates to litter removing apparatus.

An object of the invention is to provide a litter removing apparatus in which there are at least two litter conveying means each adapted to operate in a longitudinally extending gutter in a barn with such respective conveying means being actuated in response to the reciprocatory movements of another litter conveying means adapted to operate in a transversely extending gutter in such barn.

Another object of the invention is to provide a litter removing apparatus in which there are a plurality of litter conveying means operable by a single actuating means and which moves the litter automatically from the point at which it accumulates in a gutter of the barn to a discharge point outside of the barn, without having to be started or stopped or set or reset at any stage of its operation.

A further object of the invention is to provide a litter removing apparatus in which the litter conveying means adapted to operate in a cross gutter of the barn includes means for moving the litter collected in the cross gutter up an incline and discharging the thus moved litter at a point outside of the barn.

Other objects and advantages of the invention will appear from the following description considered in conjunction with the attached drawings, in which:

Figure 1 is a diagrammatic plan view, with parts broken away and in section, illustrating a barn having the litter removing apparatus of the present invention mounted therein;

Figure 2 is an enlarged sectional view with parts broken away, taken on line 2—2 of Figure 1;

Figure 3 is an enlarged sectional view, with parts broken away, taken on line 3—3 of Figure 1;

Figure 3A is a fragmentary sectional view of the arresting member in its position of blocking the path of travel of the paddles on the auxiliary beam;

Figure 4 is a plan view taken on line 4—4 of Figure 2;

Figure 5 is a plan view taken on line 5—5 of Figure 3;

Figure 6 is a cross sectional view taken on line 6—6 of Figure 2;

Figure 7 is an enlarged sectional view taken on line 7—7 of Figure 6;

Figure 8 is a cross sectional view taken on line 8—8 of Figure 7;

Figure 9 is an enlarged sectional view taken on line 9—9 of Figure 2;

Figure 10 is an enlarged fragmentary sectional view taken on line 10—10 of Figure 6;

Figure 11 is an enlarged fragmentary sectional view taken on line 11—11 of Figure 3; and Figure 12 is a sectional view taken on line 12—12 of Figure 3.

Referring to the drawings, the reference numeral 15, Figure 1, designates generally a barn, shown in diagrammatic plan view and having a front wall 16, a back wall 17 and side walls 18 and 19. A litter receiving cross gutter 20 formed in the floor of the barn 15 extends transversely of the barn 15 adjacent the back wall 17 and a plurality of spaced litter receiving gutters 21, one arranged to accommodate each row of stalls in the barn, extend longitudinally of the barn 15 and communicate with the cross gutter 20 at their rearward ends, the cross gutter 20 being substantially deeper than the longitudinal gutters 21, as shown in Figure 6. A cover 14 is adapted to close the top of the gutter 20. The litter removing apparatus of the present invention is installed in the gutters 20 and 21 and consists of the parts hereinafter described.

A beam 22, Figures 1 and 2, movabe in a linear path in opposite directions, is slidably supported in a channel iron 23 extending along and embedded in the side face of the gutter 20 adjacent the back wall 17, Figure 6. Spaced, hooked projections 37 hold the iron 23 in the face of the gutter 20.

Operatively connected to the beam 22, is means generally designated 24, Figures 1, 2 and 4, for effecting the movements of the beam 22 in opposite directions. The means 24 consists of a double-acting hydraulic cylinder 25 to which hydraulic fluid is fed from a reservoir 26, by a pump 27, through a slide valve 28 which causes periodic reversal of the flow, to impart reciprocating movement to a piston 29 to which the beam 22 is connected. Spaced tappets 30, operatively connected to the beam 22, cause the backward and forward movement of a spring biased bar 31 to operate a mechanism 32 for actuating the valve 28.

Arranged in parallel spaced relation and positioned to one side of and perpendicular to the beam 22, is a pair of beams 33 and 34, Figure 1. Specifically, each of the beams 33 and 34 is arranged along a side face of a complemental longitudinal gutter 21 and is slidably supported in a channel iron 35 extending along and embedded in said side face of the complemental gutter 21, Figure 7. Spaced, hooked projections 36 hold the irons 35 in the side faces of the gutters 21.

Means is provided to connect the beams 33 and 34 to the beam 22 so that one of the beams 33 and 34 moves in a linear path in one direction while the other of the beams 33 and 34 moves in a linear path in the opposite direction in response to the execution of the linear path movement of the beam 22 in one of its directions. The connecting means consists of a pair of flexible linkages, generally designated 38 and 39, connecting respectively the complemental ends of the beams 33 and 34, and an inverted U-shaped coupling 55 detachably connecting the linkage 39 and the beam 22.

Specifically the linkage 38 embodies a cable 40 which extends about a pair of spaced horizontally disposed pulleys 42, each positioned in the end portion of the complemental gutter 21 adjacent the front wall 16, exteriorly of the adjacent end of the complemental beam 33 or 34 and being supported from the barn floor by a bracket 43. One end of the cable 40 is connected to the adjacent end of the beam 33 and the other end of the cable 40 is connected to the adjacent end of the beam 34, the connections of the cable 40 the beams 33 and 34 being effected by cable clamps 41. The pulleys 42 are so arranged in the gutters 21 that the end portions of the cable 40 extending from the pulleys 42 to the adjacent ends of the beams 33 and 34 are in line with the respective beams and move longitudinally within the channel irons 35 when the beams 33 and 34 execute their movements in opposite directions.

The linkage 39 consists of a short beam 44 slidable in a channel iron 45 embedded in the side face of the gutter 20, adjacent the back wall 17, the iron 45 being spaced above the iron 23 and being of such length and such arrangement in the gutter face that the beam 44, sliding therein, may move from a position substantially opposite the entrance into the gutter 20 of the gutter 21 in which the beam 33 is installed, to a position substantially opposite the entrance into the gutter 20 of the gutter 21 in which the beam 34 is installed. Each end of the beam 44 is connected to the end of the adjacent beam 33 or 34 nearest the back wall 17, by a cable 46. Each cable 46 extends about a horizontally disposed pulley 47, positioned within the gutter 20 adjacent the complemental beam 33 or 34 and secured to the barn floor by a bracket 48. The pulleys 47 are so arranged that the ends of the cables 46 extending from the pulleys 47 to the adjacent ends of the complemental beams 33 and 34 are in line with the beams and move longitudinally within the channel irons 35 when the beams 33 and 34 execute their movements in opposite directions. The cables 46 are connected to the beams 33 and 34 by cable clamps 49 and to the beam 44 by eyes 50 threadably adjustable in lugs 51, formed on the beam 44, to take up slack in the cables 46.

The cable clamps 41 and 49, being of identical structure and arrangement, only the clamp 49 connecting beam 34 and cable 46 as shown in detail in Figure 10, will be described. The clamp 49 is positioned between the facing edges of the channel iron 35 so as to be slidable in the space between those edges. One end portion of the clamp 49 is connected to the end portion of the beam 34 adjacent the pulley 47 by screws 52 and the other end portion of the clamp 49 extends beyond the beam 34 and is thickened, as shown at 53 to extend interiorly of the adjacent portion of the channel iron 35. The thickened portion 53 is provided with spaced apertures extending therethrough longitudinally of the clamp 49, the aperatures being of diameter sufficient to receive the cable 46. The free end of the cable 46 is passed through one of the apertures in the portion 53 and looped into the other aperture and a set screw 54, extending into the clamp 49 from the free face of the thickened portion 53, bears against the portion of the cable 46 within one of the apertures in the portion 53, to lock the end of the cable 46 in the clamp 49.

The inverted U-shaped coupling 55 consists of a bight portion 56, positioned adjacent the channel iron 45 and a pair of diverging legs 57 having their free ends secured to the adjacent portions of the beam 22 by appropriate attaching means 58, a spacing piece 59 being interposed between each leg 57 and the adjacent portion of the beam 22 so that the legs 57 will be clear of the channel iron 45. The upper surface of the bight 56 remote from the hydraulic means 24, is cut down below the level of the remainder of the bight 56 to form an upright shoulder 60 in the upper surface of the bight 56 intermediate its ends. A pin 61, projecting outwardly from a block 62 secured to the exposed portion of the short beam 44 and extending ouwardly through the space between the edges of the channel iron 45, is arranged to come into bearing contact against the shoulder 60 when the beam 44 and the coupling 55 are brought together. In side by side relation to the bight 56 and pivotally connected at one end to the end of the bight 56, adjacent the hydraulic means 24, is a latch 63 having, intermediate its ends, a notch 64 adapted to engagingly receive the pin 61 when the pin 61 is in contact with the shoulder 60, as shown in Figure 2, to detachably connect the coupling 55 to the beam 44 and thus to the linkage 39 and the beam 22. A stop 69 projecting from a side of the bight 56 prevents the latch 63 from swinging below a horizontal position when it is out of engagement with the pin 61. The lower edge of the free end portion of the latch 63 is beveled upwardly as shown at 65.

A second pair of beams 70 and 71, arranged in parallel spaced relation perpendicular to the beam 22, are positioned to the same side of the beam 22 as the beams 33 and 34 and are spaced from the beams 33 and 34. Specifically each of the beams 70 and 71 is arranged along a side face of a complemental gutter 21 in the floor of the barn 15, the gutters 21 carrying the beams 70 and 71 being similar to and arranged in spaced parallel relation with respect to the gutters 21 carrying the beams 33 and 34. Means, identical with that just described with respect to beams 33 and 34, is provided for connecting the beams 70 and 71 to the beam 22 so that one of the beams 70 and 71 moves in a linear path in one direction while the other of the beams 70 and 71 moves in a linear path in the opposite direction in response to the execution of the linear path movement of the beam 22 in one of its directions.

Operatively connected to each of the first and second named connecting means, namely the connecting means relating to the beams 33 and 34 and that relating to the beams 70 and 71, is hand actuable means for disconnecting the beams 33 and 34 and the beams 70 and 71 from the beam 22. The two means are identical in structure and operation and therefore only the one relating to the beams 33 and 34 will be described in detail. A horizontally disposed crank 66, positioned exteriorly of the cover 14 of the gutter 20 adjacent the end of the channel iron 45 remote from the hydraulic means 24 is rotatably supported in the cover 14 and has a shaft 67 which extends through the cover 14. Connected to the end of the shaft 67 interiorly of the cover 14, for rotation with the shaft 67, is an L-shaped member 68, the projecting free end of the member 68, when the beam 44 and the coupling 55 are in their movement positions adjacent the crank 66, being engageable with the beveled edge 65 of the latch 63, upon turning movement of the crank 66, to raise the latch 63 out of engagement with the pin 61.

Vertically disposed transversely of each of the beams 22, 33, 34, 70 and 71 and within the complemental gutters 20 or 21, is a plurality of spaced paddles 72, Figure 7, Figure 8 and Figure 9. Each of the paddles 72 is carried by a horizontal axis 75 on the adjacent beam so that it is held in a fixed vertical position upon execution of the linear movement of that beam in one direction, the direction away from the means 24 in the case of beam 22 and the direction away from the front wall 16 in the case of the other beams, and is freely swingable about the axis 75 to a position other than the vertical position upon execution of the linear movement of the beam in the opposite direction, Figure 8. The paddles 72 are spaced along the beams 22, 33, 34, 70 and 71 at a distance slightly less than that of the movement of the beams in opposite directions, so that the movement positions of adjacent paddles overlap at the adjacent end portions of their paths of movement. The horizontal axis 75 of each paddle 72 is swingable from a horizontal position to an upright position, as shown in the broken lines in Figures 7 and 9.

The structure and mode of connection to the beam is substantially the same for all paddles 72 and consequently only one will be described in detail. The paddle 72 includes an upright sheet of rigid material cut to fit the cross sectional area of the complemental gutter 20 or 21, with a small clearance. A sheet 73 is dependingly connected to a horizontally disposed sleeve 74 which is rotatably supported on a horizontal axis 75, a shaft connected at one end to the complemental beam. A pair of spaced stop screws 76, projecting transversely from the shaft 75 into slots 77 cut in the sleeve 74, limit the possible rotary movement of the paddles 72 with respect to the shaft 75 from a horizontal position, as shown in solid lines in Figure 8, to a raised position in the direction away from the hydraulic means 24 in the case of the paddles on the beam 22 and away from the front wall 16 in the case of paddles 72 on the other beams, as shown in broken lines in Figure 8.

The end of the shaft 75, connected to the complemental beam, has a horizontally disposed stub shaft 78 thereon, which is pivotally received, adjacent its ends, in spaced bearings 79 extending outwardly from the adjacent portion of the complemental beam in the space between the facing edges of the complemental channel iron, the connection permitting the shaft 75 to be swung from the horizontal position, as shown in solid lines in Figures 7 and 9 to an upright position as shown in the broken lines in Figures 7 and 9. A projection 80 from the stub shaft 78 bears against the lower surface of the base of the bearing 79, as shown in Figure 7, upon downward movement of the shaft 75, to prevent such downward movement of the shaft 75 beyond the horizontal position shown in the solid lines in Figure 7. In the paddle 72 installed in the cross gutter 20, an additional projection 81 is provided on a stub shaft 78, the projection 81 extending upwardly and striking against the upper surface of the base of the bearing 79 to limit the upward movement of the shaft 75 and the paddles 72 to the position shown in the broken lines in Figure 9. Each paddle 72 is provided with a grease fitting 82 upon the upper surface of the sleeve 74 through which grease may be inserted between the shaft 75 and the sleeve 74.

Arranged in end to end aligned relation with respect to the beam 22, is an auxiliary beam 83 having the confronting end flexibly connected to the confronting end of the beam 22 for movement with the beam 22, the auxiliary beam 83 sloping upwardly from the beam 22. The beam 83 is slidable, in the manner of the beam 22 in a channel iron 84 aligned with the iron 23 and extending along the upper edge of one side 85 of an upwardly sloping auxiliary gutter 86, formed of rigid material and aligned with and having its lower end in communication with the end of the gutter 20 remote from the hydraulic means 24. The other end of the auxiliary gutter 86 projects exteriorly of the side wall 18 of the barn 15 and is open for the discharge of litter therefrom.

The flexible connection between the beam 22 and the beam 83 is effected by link bars 87, 88 and 89 arranged in end to end, partially overlapping relation in the order named between the beams 22 and 83 within the gutter 86 and contiguous to the openings in the adjacent portions of the channel irons 23 and 84. The overlapping end portions of the bars 88 and 89 are pivotally connected by pin 90 projecting out of the opening in the channel iron 84 and carried by a disc 91 movable longitudinally within the iron 84, Figure 11. The overlapping ends of the bars 87 and 88 are similarly connected. The other end of the bar 89 is pivotally connected to the adjacent end of the beam 83 by pin 92 carried by the beam 83 and projecting out of the opening in the channel iron 84. The other end of the bar 87 is similarly connected to the adjacent end of the beam 22.

Carried by the auxiliary beam 83 is a plurality of spaced paddles 93, each vertically disposed transversely of the beam 83 and connected to the beam 83 so that the paddles 93 are held in a fixed vertical position upon execution of the linear movement of the beam 83 in one direction, the direction toward the free end of the gutter 86, and are freely swingable to a position other than a vertical position upon execution of the linear movement of the beam 83 in the opposite direction. The paddles 93 are of construction similar to that of the paddles 72 and each is rotatably supported, in similar manner, upon a shaft 94 extending outwardly from and carried by the beam 83. The shafts 94 are connected to the beam 83 in manner similar to the connection of the shaft 75 to the beams 22, 33 and 34 and are similarly swingable from a horizontal position to an upright position, being limited in the latter movement position as are the paddles 72 on the beam 22. One paddle 93 is located between the facing ends of the beams 22 and 83 and is connected to the adjacent link bar 88 rather than to either of the beams 22 or 83, as shown in Figure 11. The manner of connection of the paddle 93 is similar to that of the connection of the other paddles 93 to the beam 83, there being a transversely extending stub shaft 95 on the connected end of the shaft 94 which is journaled, adjacent its ends, in spaced bearings 96 formed on the inner side of the link bar 88. The stub shaft 95, in contradistinction to the stub shaft 78, is bowed outwardly at its intermediate portion to clear the adjacent end of the pin 90.

Positioned contiguous to and in the path of travel of each of the paddles 93 of the auxiliary beam 83, except the paddle 93 nearest the free end of the auxiliary gutter 86, is an arresting member 97 which is operable to block the path of travel of the said paddles 93 upon execution of the linear movement of the beam 83 in the direction away from the free end of the gutter 86 and to be shifted out of the path of travel of said paddles 93 upon execution of the linear movement of the beam 83 toward the free end of the gutter 86. Each arresting member 97 comprises an arcuate blade 98 depending into the auxiliary gutter 86 from a horizontal shaft 99 projecting over the gutter 86 from the upper end of an upright arm 100 positioned exteriorly and projecting above the side 101, of the gutter 86 and connected to the gutter 86 for swinging movement about a horizontal axis, the axis consisting of a horizontal extension 102 from the lower end of the arm 100 which is journaled in a pair of spaced bearings 103 formed on the undersurface of the bottom of the gutter 86. Each blade 98 is arranged with its convex face toward the free end of the gutter 86. A stop 104 projects outwardly from the side 101 of the gutter 86, intermediate its top and bottom, to limit the swinging movement of the arm 100 in the direction toward the connected end of the gutter 86. The arm 100 is thus free to swing from a position in which its upper end and a shaft 99 are above the top of the gutter 86, as shown in the solid lines in Figure 3 and in Figure 12, to a position in which the shaft 99 is flush with the top of the gutter 86, as shown in broken lines in Figure 3 and in Figure 3A, the blade 98 being thus raised and lowered in the gutter 86. The upper corner of the blade 98, adjacent the wall 85 of the gutter 86, is cut away, as shown at 105, to define a space between the upper portion of the edge of the blade 98 adjacent the wall 85.

Carried on the auxiliary beam 83 are cooperating elements 106 which pressingly engage the arresting members 97 when the latter members block the path of travel of the paddles 93 upon execution of the linear movement of the beam 83 in the direction away from the free end of the guttre 86 and liftingly engage the arresting members 97 when the latter members are shifted out of the path of travel of the paddles 93 upon execution of the linear movement of the beam 83 in the direction toward the free end of the gutter 86. The elements 106 consist of rollers positioned adjacent the beam 83 and rotatable about horizontal axes 107 transverse of the beam 83 and carried by projections 108 from the beam 83 which extends slidably through the opening in the channel iron 84. The rollers 106 are so positioned and are of such size that when they move against the convex side of the blade 98 they press it down and ride over it passing through the space between the edge of the blade 98 and the wall 85 afforded by the cut away portion 105 and when the roller 106 moves against the concave side of the blade 98, it raises the blade and passes under it.

In general practice in the construction of dairy and other types of barns, the gutters 21 are so arranged along the outer ends of the stalls of the barn, that the bulk of the litter from the stalls will accumulate in the gutters 21 and other litter from the stalls may be easily swept into the gutters 21. To place the apparatus of the present invention in operation to remove the litter from a related pair of gutters 21 of the barn 15 as, for example the gutters 21 in which the beams 33 and 34 are installed, the short beam 44 and the coupling 55, relating to those gutters, are moved adjacent to each other and connected together by bringing the latch 63 into engagement with the pin 61, the crank 66 being turned to a position in which the L-shaped member 68 will not interfere with such engagement. The hydraulic means 24 is then turned on to give reciprocating motion to the beam 22 and paddles 73 thereon, which motion is transmitted to the beam 83 and paddles 93 through the link bars 87, 88 and 89, and to the beams 33 and 34 and the paddles 72 thereon, by the coupling 55 and the linkages 38 and 39. As the beam 22 is moved away from the hydraulic beams 24, the paddles 72 on the beam 33 will be moved rearwardly of the barn 15 toward the gutter 20. As the paddles 72 are thus moved toward the gutter 20 they will be in the vertical position, as shown in Figures 7 and 8, and will be prevented from swinging upwardly in a direction away from the gutter by reason of the arrangement of the screws 76 and slots 77 as above described. Consequently in moving toward the gutter 20, the paddles 72 on the beam 33 will move the litter in the underlying gutter 21 toward the gutter 20. When the beam 22 is moved toward the hydraulic means 24, the paddles 72 on the beam 34 will similarly be moved rearwardly of the barn 15 toward the gutter 20 pushing the litter in the underlying gutter 21 with them. By reason of the linkages 38 and 39, the beam 34 is moved toward the gutter 20 when the beam 33 is moved away from the gutter 20 and vice versa. As each of the beams 33 and 34 moves in turn away from the gutter 20, the paddles 72 thereon, except that nearest the front wall 16 will be brought forward against the accumulation of litter moved up in front of it by the paddle 72 next to it in the direction of the front of the barn 15. When each paddle 72 thus strikes the accumulation of litter in front of it, it will not be held in the vertical position as in the case of movement in the opposite direction, but will be free to swing upwardly in the direction toward the gutter 20, to the raised position shown in broken lines in Figure 8, and will thus ride over the accumulation of litter in front of it. Since the ends of the paths of movement of adjacent paddles slightly overlap, each paddle, as it reaches its extreme forward position away from the gutter 20, will have cleared the accumulation of litter brought up in front of it by the next forward paddle and will be free to swing back to its vertical position in front of the accumulation just cleared, in which position it is ready to move that accumulation a step further toward the gutter 20 on the next rearward movement of the beam 33. In the manner here described, the accumulation originally picked up by each paddle 72 is pushed in successive steps by succeeding paddles 72 from its initial position in the gutter 21 into the gutter 20. Once in the gutter 20, the accumulation is passed successively along from paddles 72 to paddles 72 of the beam 22, in similar manner, until it reaches the auxiliary gutter 86. At the entrance to the auxiliary gutter 86, the accumulation is engaged by the nearest paddle 93 and pushed upwardly along the inclination of the gutter 86. As the reverse movement of the paddle 93 sets in, the blade 98 of the adjacent arresting member 97 will swing downwardly to the place occupied by the paddle 93 at its greatest point of advance and prevents the accumulation brought up by the paddle 93 from sliding backwardly down the gutter 86. The accumulation of litter is thus held in a position to be engaged by the next paddle 93 as that paddle reaches its movement position nearest the connected end of the gutter 86. As the said next paddle 93 approaches that position, the cooperating element, or roller 106 will strike and roll up on the convex surface of the blade 98 forcing it and the supporting arm 100 downwardly to their lowest movement position, as shown in Figure 3A, the roller 106 ultimately passing through the space defined by the cut away portion 105 of the blade 98. The sleeve of the paddle 93 will then strike against and ride upwardly on the convex surface of the blade 98, causing the shaft 94 to swing upwardly and pass over the top of the arresting member 97, as shown in Figure 3A. At the same time, the paddle 93 will strike the convex surface of the blade 98 and will swing upwardly so as to pass over the member 97. At the end of its movement toward the connected end of the gutter 86, the paddle 93 will have completely cleared the member 97 and will swing downwardly to a position vertical with respect to the gutter 86 and upon the opposite side of the member 97 from the accumulation of litter supported by the member 97. The movement of the paddle 93 toward the free end of the gutter 86 will now begin and the paddle will strike the concave side of the blade 98 causing it and the supporting arm 100 to swing upwardly toward the position shown in Figure 12 and in the solid lines in Figure 3. The roller 106 will also pass beneath the blade 98, further raising it and the arm 100. As the paddle 93 raises the arresting member 97 it will replace the member 97 in supporting the litter accumulation thereagainst and as the paddle 93 now moves toward the free end of the gutter 86, with the movement of the beam 83, it will push the accumulation along the gutter 86 to the point at which it may be reached by the next paddle 93 in the direction of the free end of the gutter 86. The accumulation will thus be passed along from paddle 93 to paddle 93 until it reaches and is discharged from the free end of the gutter 86 onto a pile or into some waiting receptacle or vehicle exteriorly of the barn 15 and beneath the free end of the gutter 86.

The beams 33 and 34 may be disconnected at any time from the beam 22 by turning the hand crank 66 so as to bring the free end of the L-shaped member 68 into alignment with the latch 63 so that when the short beam 44 and the coupling 55 next reach the end of the path of movement adjacent the member 68, the latch 63 will be raised out of engagement with the pin 61, disconnecting the coupling from the beam 44 and freeing the linkage 39 and, thus, the beams 33 and 34 from movement from the beam 22. The coupling 55 will continue to move with the beam 22 but, so long as the member 68 remains in the aligned position with respect to the latch 63, the latch 63 will be raised whenever the coupling 55 moves up beside the short beam 44, thus preventing the latch 63 from engaging the pin 61.

The beams 70 and 71 may, at any time, be connected to the beam 22, for the removing of the litter in the gutters in which those beams are installed, by moving the crank 66 controlling the connection of those beams, so as to free the complemental latch 63 to engage the complemental pin 61. The operation of the apparatus in removing the litter from the second pair of gutters will then be similar to that just described. The entire apparatus may be stopped at any time, of course, by turning off the hydraulic means 24.

While the apparatus of this invention has been specifically described for the removal of barn litter, it is to be understood that it may be employed for conveying mixed concrete, grain, coal, crushed stone, lime, etc.

What is claimed is:

1. Litter removing apparatus comprising a beam movable in a linear path in opposite directions, means operatively connected to said beam for effecting the movements of said beam in opposite directions, a pair of beams arranged in parallel spaced relation positioned on one side of and perpendicular to said first beam, means connecting said pair of beams to said first named beam so that one of the pair of beams moves in a linear path in one direction while the other of the pair of beams moves in a linear path in the opposite direction in response to the execution of the linear path movement of said first named beam in one of its directions, a second pair of beams arranged in parallel spaced relation positioned on said one side of said first named beam and perpendicular to said last mentioned beam and spaced from said first pair of beams, means connecting said second pair of beams to said first named beam so that one of the second pair of beams moves in a linear path in one direction while the other of the second pair of beams moves in a linear path in the opposite direction in response to the execution of the linear path movement of said first named beam in one of its directions, hand actuable means operatively connected to each of said first and second named connecting means for disconnecting said first or second named pairs of beams from said first named beam, and a plurality of spaced paddles each vertically disposed transversely of each of said first named beam and of said pairs of beams, each of said paddles being carried by the adjacent beam so that it is held in a fixed vertical position upon execution of the linear movement of the last mentioned beam in one direction and being freely swingable to a position other than vertical position upon execution of the linear movement of the last mentioned beam in the opposite direction.

2. Litter removing apparatus comprising a beam movable in a linear path in opposite directions, means operatively connected to said beam for effecting the movements of said beam in opposite directions, means operatively connected to said beam for effecting the movements of said beam in opposite directions, an auxiliary beam arranged in end to end aligned relation with respect to said first mentioned beam and having the confronting end flexibly connected to the confronting end of said first mentioned beam for movement with the latter, said auxiliary beam sloping upwardly from said first named beam, a plurality of spaced paddles each vertically disposed transversely of said auxiliary beam and carried by the last named beam so that it is held in a fixed vertical position upon execution of the linear movement of the last named beam in one direction and being freely swingable to a position other than the vertical position upon execution of the linear movement of the last named beam in the opposite direction, an arresting member positioned contiguous to and in the path of travel of a paddle of said auxiliary beam and operable to block the path of travel of said paddle upon execution of the linear movement of the last named beam in the opposite direction and to be shifted out of the path of travel of said paddle upon execution of the linear movement of said last named beam in said one direction, a pair of beams arranged in parallel spaced relation positioned on one side of and perpendicular to said first beam, means connecting said pair of beams to said first named beam so that one of the pair of beams moves in a linear path in one direction while the other of pair of beams moves in a linear path in the opposite direction in response to the execution of the linear path movement of said first named beam in one of its directions, and a plurality of spaced paddles each vertically disposed transversely of each of said first named beam and of said pair of beams, each of said paddles being carried by the adjacent beam so that it is held in a fixed vertical position upon execution of the linear movement of the last mentioned beam in one direction and being freely swingable to a position other than the vertical position upon execution of the linear movement of the last mentioned beam in the opposite direction.

3. Litter removing apparatus comprising a beam movable in a linear path in opposite directions, means operatively connected to said beam for effecting the movements of said beam in opposite directions, an auxiliary beam arranged in end to end aligned relation with respect to said first mentioned beam and having the confronting end flexibly connected to the confronting end of said first mentioned beam for movement with the latter, said auxiliary beam sloping upwardly from said first named beam, a plurality of spaced paddles each vertically disposed transversely of said auxiliary beam and carried by the last named beam so that it is held in a fixed vertical position upon execution of the linear movement of the last named beam in one direction and being freely swingable to a position other than a vertical position upon execution of the linear movement of the last named beam in the opposite direction, an arresting member positioned contiguous to and in the path of travel of a paddle of said auxiliary beam and operable to block the path of travel of said paddle upon execution of the linear movement of the last named beam in the opposite direction and to be shifted out of the path of travel of said paddle upon execution of the linear movement of said last named beam in said one direction, a cooperating element on said auxiliary beam and pressingly engaging said arresting member when the latter member blocks the path of travel of said paddle upon execution of the linear movement of the last named beam in the opposite direction and liftingly engaging said arresting member when the latter member is shifted out of the path of travel of said paddle upon execution of the linear movement of said last named beam in said one direction, a pair of beams arranged in parallel spaced relation positioned on one side of and perpendicular to said first beam, means connecting said pair of beams to said first named beam so that one of the pair of beams moves in a linear path in one direction while the other of the pair of beams moves in a linear path in the opposite direction in response to the execution of the linear path movement of said first named beam in one of its directions, and a plurality of spaced paddles each vertically disposed transversely of each of said first named beam and of said pair of beams, each of said paddles being carried by the adjacent beam so that it is held in a fixed vertical position upon execution of the linear movement of the last mentioned beam in one direction and being freely swingable to a position other than a vertical position upon execution of the linear movement of the last mentioned beam in the opposite direction.

4. In a litter removing apparatus, a beam movable in a linear path in opposite directions, means operatively connected to said beam for effecting the movements of said beam in opposite directions, an auxiliary beam arranged in end to end aligned relation with respect to said first mentioned beam and having the confronting end flexibly connected to the confronting end of said first mentioned beam for movement with the latter, said auxiliary beam sloping upwardly from said first named beam, a plurality of spaced paddles each vertically disposed transversely of said auxiliary beam and carried by the last named beam so that it is held in a fixed vertical position upon execution of the linear movement of the last named beam in one direction and being freely swingable to a position other than a vertical position upon execution of the linear movement of the last named beam in the opposite direction, an arresting member positioned contiguous to and in the path of travel of a paddle of said auxiliary beam and operable to block the path of travel of said paddle upon execution of the linear movement of the last named beam in the opposite direction and to be shifted out of the path of travel of said paddle upon execution of the linear movement of said last named beam in said one direction.

5. In a litter removing apparatus, a beam movable in a linear path in opposite directions, means operatively connected to said beam for effecting the movements of said beam in opposite directions, an auxiliary beam arranged in end to end aligned relation with respect to said first mentioned beam and having the confronting end flexibly connected to the confronting end of said first mentioned beam for movement with the latter, said auxiliary beam sloping upwardly from said first named beam, a plurality of spaced paddles each vertically disposed transversely of said auxiliary beam and carried by the last named beam so that it is held in a fixed vertical position upon execution of the linear movement of the last named beam in one direction and being freely swingable to a position other than the vertical position upon execution of the linear movement of the last named beam in the opposite direction, an arresting member positioned contiguous to and in the path of travel of a paddle of said auxiliary beam and operable to block the path of travel of said paddle upon execution of the linear movement of the last named beam in the opposite direction and to be shifted out of the path of travel of said paddle upon execution of the linear movement of said last named beam in said one direction, a cooperating element on said auxiliary beam and pressingly engaging said arresting member when the latter member blocks the path of travel of said paddle upon execution of the linear movement of the last named beam in the opposite direction and liftingly engaging said arresting member when the latter member is shifted out of the path of travel of said paddle upon execution of the linear movement of said last named beam in said one direction.

References Cited in the file of this patent

UNITED STATES PATENTS

| | | |
|---|---|---|
| 416,764 | Towne | Dec. 10, 1889 |
| 1,529,875 | Davis | Mar. 17, 1925 |
| 1,771,778 | Davis | July 29, 1930 |
| 2,522,888 | Nickerson | Sept. 19, 1950 |
| 2,681,132 | Knutson | June 15, 1954 |

FOREIGN PATENTS

| | | |
|---|---|---|
| 411,987 | Germany | Apr. 7, 1925 |